(12) United States Patent
Kohno

(10) Patent No.: US 9,307,152 B2
(45) Date of Patent: Apr. 5, 2016

(54) DISPLAY CONTROL APPARATUS AND CAMERA SYSTEM WHERE DIALOGUE BOX IS DISPLAYED BASED ON DISPLAY MODE

(71) Applicant: CANON KABUSHIKI KAISHA, Tokyo (JP)

(72) Inventor: Akihiro Kohno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 13/927,547

(22) Filed: Jun. 26, 2013

(65) Prior Publication Data

US 2014/0002708 A1    Jan. 2, 2014

(30) Foreign Application Priority Data

Jun. 28, 2012  (JP) ................................ 2012-145744

(51) Int. Cl.
*H04N 5/232* (2006.01)

(52) U.S. Cl.
CPC .......... *H04N 5/23293* (2013.01); *H04N 5/232* (2013.01); *H04N 5/23216* (2013.01)

(58) Field of Classification Search
CPC ... G09G 2320/068; H04N 5/77; H04N 5/772; H04N 1/2112; H04N 1/2116; H04N 1/212; H04N 1/215; H04N 21/4147; H04N 7/18; H04N 348/143; H04N 5/23293; H04N 5/232; H04N 5/23216; G11B 31/006; G03B 2206/00; G08B 13/196; G06T 2207/30232

See application file for complete search history.

(56) References Cited

U.S. PATENT DOCUMENTS

| | | | | |
|---|---|---|---|---|
| 5,572,649 | A | * | 11/1996 | Elliott et al. ................... 715/788 |
| 7,269,797 | B1 | * | 9/2007 | Bertocci et al. ............... 715/783 |
| 8,806,367 | B2 | * | 8/2014 | Taguchi ......................... 715/794 |
| 2006/0233192 | A1 | * | 10/2006 | Mihara ......................... 370/463 |
| 2007/0024706 | A1 | * | 2/2007 | Brannon et al. .............. 348/142 |

FOREIGN PATENT DOCUMENTS

JP          H11-15626 A        1/1999

OTHER PUBLICATIONS

CANON Network Camera VB-M700F, VB-M600DNB-M600VE, VB-M40 Operation Guide, 157 pgs (2011).

* cited by examiner

*Primary Examiner* — Shahbaz Nazrul
(74) *Attorney, Agent, or Firm* — Carter, DeLuca, Farrell & Schmidt, LLP

(57) ABSTRACT

A display control apparatus for controlling a display of a video image photographed by a camera discriminates a state and controls a display of a dialogue box in accordance with data which shows whether or not the dialogue box is displayed in accordance with a display mode for displaying the video image photographed by the camera and with the determined state.

22 Claims, 6 Drawing Sheets

FIG. 2
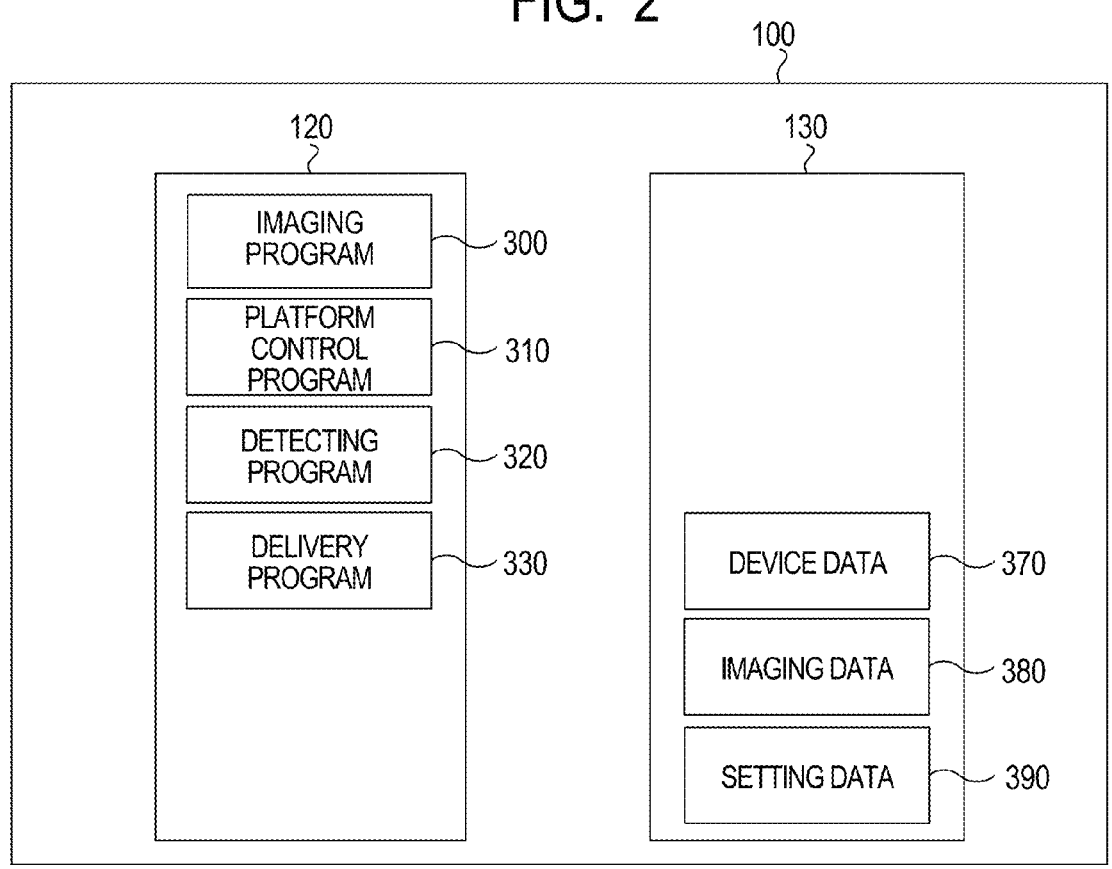
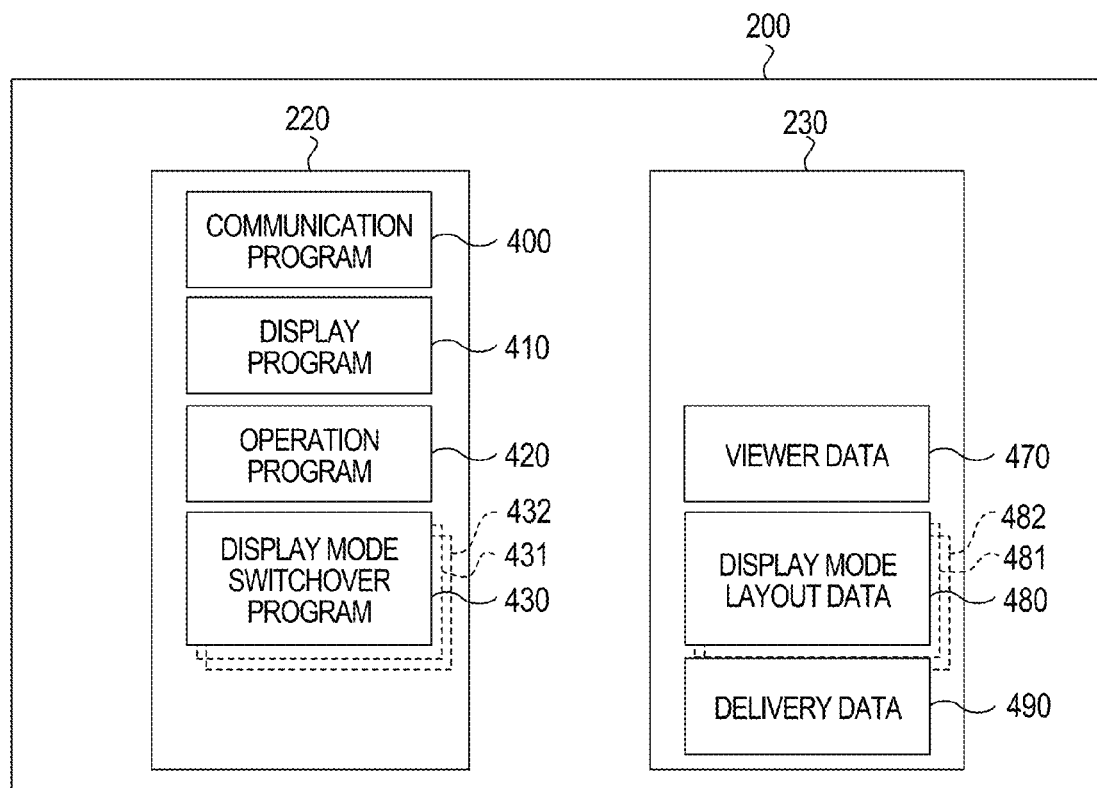

FIG. 5

| MODE NAME | FUNCTION NAME | X-COORDINATE | Y-COORDINATE | DISPLAY |
|---|---|---|---|---|
| NOMAL DISPLAYING | CONTROL | 400 | 10 | ON |
| | EVENT DISPLAYING | 300 | 200 | ON |
| | PANORAMA SCREEN CONTROL | 5 | 350 | ON |
| | SOUND | 5 | 275 | OFF |
| | VIEWER PTZ | 350 | 50 | OFF |
| | ... | ... | ... | ... |
| FULL-SCREEN DISPLAYING | CONTROL | 1000 | 5 | OFF |
| | EVENT DISPLAYING | 850 | 600 | ON |
| | PANORAMA SCREEN CONTROL | 0 | 0 | ON |
| | SOUND | 320 | 0 | OFF |
| | VIEWER PTZ | 900 | 320 | ON |
| | ... | | | |
| ... | ... | ... | ... | ... |

DISPLAY CONTROL APPARATUS AND CAMERA SYSTEM WHERE DIALOGUE BOX IS DISPLAYED BASED ON DISPLAY MODE

BACKGROUND OF THE INVENTION

1. Field of the Invention

The present invention relates to a display control apparatus and a camera system.

2. Description of the Related Art

In recent years, as a monitoring camera system, a network camera which can freely perform a PTZR (pan, tilt, zoom, rotation) driving has been spread and many kinds of various functions have been provided. Therefore, there is a monitoring camera system in which video display units corresponding to a plurality of video sizes, functional dialogues (dialogue boxes) corresponding to a plurality of camera operations, and the like are displayed in a mixed manner.

As a system which handles a plurality of windows, a variety of systems such as general OS itself, image editing software, document editing software, remote communication tool of an application sharing type, and the like exist. There is also software which can manage a layout of a plurality of window groups.

For example, the network camera has a UI for switching a photographed video image to an image size such as QVGA, VGA, or SXGA and displaying and a UI for providing camera functions such as control dialogue of PTZ, event displaying dialogue, panorama screen control dialogue, and the like to the user (for example, network camera VB-M40 made by Canon Inc).

Further, what is called a viewer PTZ or the like in which one rectangle is cut out from a video image displayed on a viewer of the client and is displayed as if it was electronically PTZ-driven has also been realized (for example, network camera VB-M600 made by Canon Inc).

As a function of the OS such as Windows (registered trademark) or a function of Explorer, there is such a function that previous window display information is stored and, when the window is displayed again, its display position is restored.

Further, there is such a function that by software having a plurality of operating modes, layout information of windows which are displayed on a screen is stored every operating mode, when the operating mode is switched, they are displayed in accordance with the stored layout information (publication of U.S. patent application 2006/0233192). Therefore, each time the display mode is switched, the positions can be restored and the windows can be displayed by the layout which is conditional on the display mode.

When a plurality of windows or dialogues are displayed, they can be also automatically arranged (Japanese Patent Application Laid-Open No. H11-15626).

In an image displaying apparatus in the monitoring camera system, display units of monitor video images are important. Further, among them, since the video image is carefully viewed in accordance with a situation or the camera operation is necessary, a watching location and functions to be used are not fixed. Particularly, in the case of enlarging an image size for the purpose of monitoring, a highlighted portion is important.

However, there is such a problem that even if the positions are merely restored to a layout which has previously been conditional on, the images cannot be always displayed in a desirable layout.

SUMMARY OF THE INVENTION

It is an aspect of the invention to enable a suitable dialogue box to be displayed in accordance with a display mode for displaying a video image photographed by a camera.

According to an aspect of the present invention, provided is a display control apparatus comprising: a determining unit configured to determine a state; and a control unit configured to control a displaying of a dialogue box, based on data stored in a memory indicating as to whether the dialogue box is displayed or not according to a displaying mode for displaying an image photographed by a camera, and based on the state determined by the determining unit.

Further features of the present invention will become apparent from the following description of exemplary embodiments with reference to the attached drawings.

BRIEF DESCRIPTION OF THE DRAWINGS

FIG. 2 is a map diagram schematically illustrating various kinds of programs and data according to the embodiment of the invention.

FIG. 5 is a diagram illustrating an example of display mode layout data.

DESCRIPTION OF THE EMBODIMENTS

Details of an embodiment of the invention will be described hereinbelow.

Figure 1:
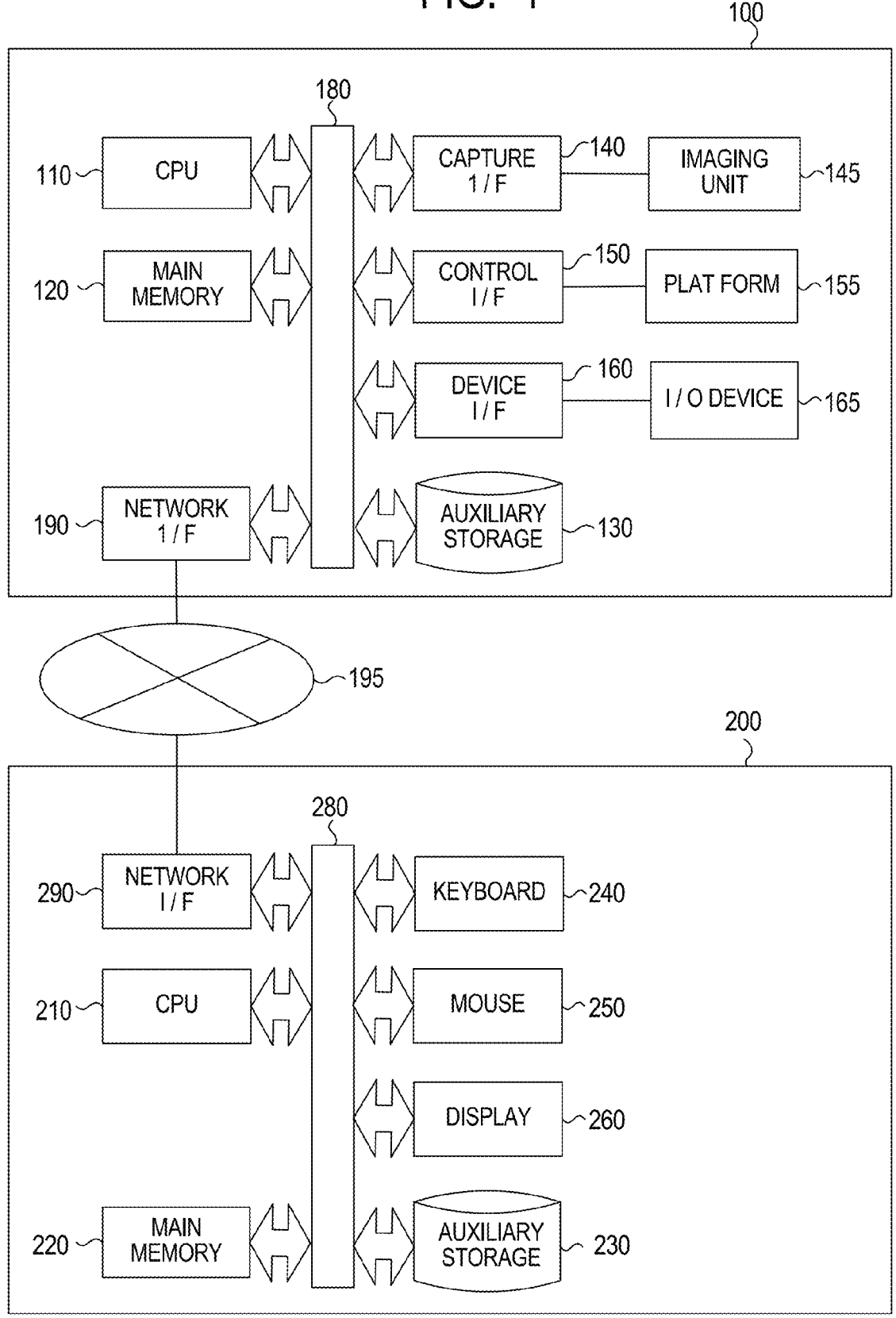
FIG. 1 is a block diagram illustrating an example of a construction of a monitoring camera system according to an embodiment of the invention.

FIG. 1 is a block diagram illustrating an example of a detailed construction of a monitoring camera system constructed by a monitoring camera (hereinbelow, referred to as a camera server) 100 and a viewer client (hereinbelow, referred to as an image display apparatus) 200.

In the camera server 100, a CPU 110, a main memory 120, an auxiliary storage 130, a video capture I/F 140, a control I/F 150, a device I/F 160, and a network I/F 190 are mutually connected through an internal bus 180.

The main memory 120 is a high-speed writable storage device represented by a RAM. An OS, various kinds of programs, and various kinds of data are loaded into the main memory 120. The main memory 120 is also used as a work area of the OS and various kinds of programs.

The auxiliary storage 130 is a non-volatile storage device represented by an FDD, an HDD, a flash memory, a CD-ROM drive, or the like. The auxiliary storage 130 is used as a permanent storage area of the OS, various kinds of programs, and various kinds of data and is also used as a storage area of various kinds of data of a short period.

An imaging unit 145 is connected to the video capture I/F 140. The video capture I/F 140 converts and compresses image data photographed by the imaging unit 145 into data of a predetermined format and transfers to the main memory 120. A platform 155 is connected to the control I/F 150. The control I/F 150 obtains states of a panning mechanism, a tilting mechanism, a rotating mechanism, and a zooming mechanism of the platform 155 and controls the platform 155 in response to instructions.

An I/O device 165 is connected to the device I/F 160. The device I/F 160 receives a signal or interruption from the outside and outputs a signal to the outside. The network I/F 190 is an I/F for connecting to a network 195. The network I/F 190 functions as an I/F for outputting image data and connecting to a recording apparatus such as a DVR or the like in a manner similar to a CCTV camera in the related art or an I/F for communicating with various kinds of clients such as an image display apparatus 200 and the like through a communication medium such as Ethernet (registered trademark) or the like as a network camera.

In the image display apparatus 200, a CPU 210, a main memory 220, an auxiliary storage 230, a keyboard 240, a mouse 250, a display 260, and a network I/F 290 are mutually connected through an internal bus 280.

The main memory 220 has a construction similar to that of the main memory 120. The auxiliary storage 230 has a construction similar to that of the auxiliary storage 130 of the camera server 100. The keyboard 240 and the mouse 250 are general input devices for giving an instruction. The display 260 is a general output device for displaying. The network I/F 290 is an I/F for connecting to a network 195, is similar to the network I/F 190, and can be mutually connected thereto.

As illustrated in FIG. 2, an imaging program 300, a platform control program 310, a detecting program 320, and a delivery program 330 are loaded into the main memory 120 of the camera server 100. Device data 370, imaging data 380, setting data 390, and the like are stored in the auxiliary storage 130 of the camera server 100.

As illustrated in FIG. 2, a communication program 400, a display program 410, an operation program 420, and a display mode switchover program 430 are loaded into the main memory 220 of the image display apparatus 200. Viewer data 470, display mode layout data 480, delivery data 490, and the like are stored in the auxiliary storage 230 of the image display apparatus 200 in FIG. 2.

The imaging program 300 processes a video image from the imaging unit 145 by the video capture I/F 140 and holds the imaging data 380 in the auxiliary storage 130. A destination into which the imaging data is stored is not limited to the auxiliary storage 130 but may be a high-speed storage device, buffer, or the like like a main memory 120.

The platform control program 310 receives instructions from various kinds of programs and controls the platform 155 from the control I/F 150. The platform control program 310 also receives information from the platform 155, processes by the control I/F 150, notifies, and holds the device data 370 into the auxiliary storage 130. A destination into which the device data is stored is not limited to the auxiliary storage 130 but may be a high-speed storage device, buffer, or the like like a main memory 120.

The detecting program 320 receives instructions from various kinds of programs and controls the I/O device 165 from the device I/F 160. The detecting program 320 also receives information from the I/O device 165, processes by the device I/F 160, notifies various kinds of programs of the information, and holds the device data 370 into the main memory 120 or the auxiliary storage 130.

The delivery program 330 reads the setting data 390, initializes, and thereafter, delivers the updated imaging data 380 to the network 195 through the network I/F 190 in response to the image display apparatus 200, communication program 400, or another request. A delivery destination is not limited to the network 195 but may be a memory or buffer such as main memory 120 or auxiliary storage 130.

The communication program 400 receives the imaging data 380 delivered by the network I/F 290 from the camera server 100 through the network 195 and stores as delivery data 490 into the auxiliary storage 230.

Figure 3:
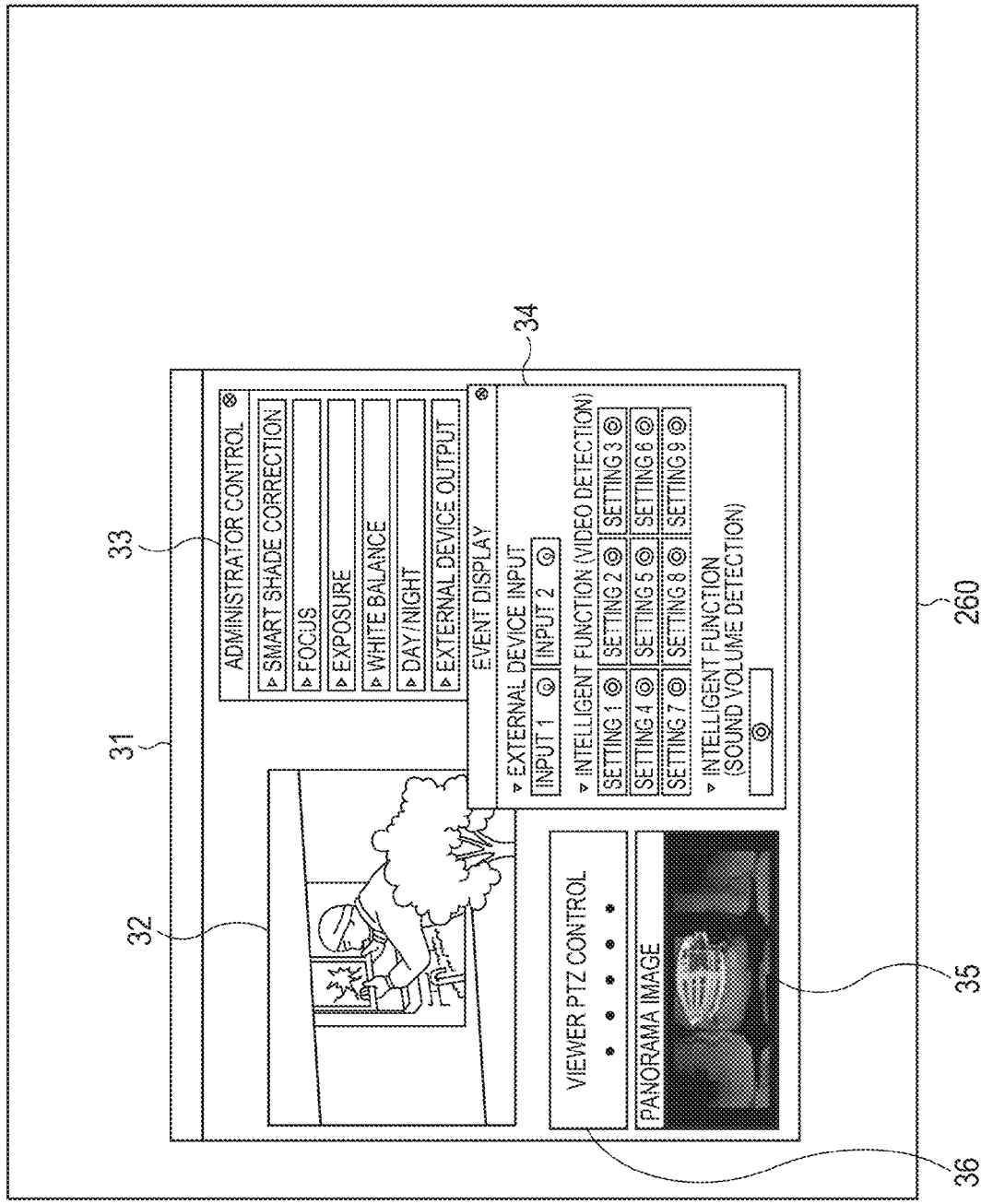
FIG. 3 is a diagram illustrating a display example of a normal display mode according to the embodiment of the invention.

Since the delivery data 490 in the auxiliary storage 230 has been updated, the display program 410 updates and displays the image on the viewer displayed on the display 260. A display example of a normal display mode of the viewer which is displayed by the display program 410 is illustrated in a viewer 31 in FIG. 3.

The viewer 31 is constructed by a monitor video display unit 32 and functional dialogues (dialogue boxes) for performing the camera operation. The monitor video display unit 32 displays a video image photographed by the imaging unit 145. The functional dialogues are constructed by, for example, a control dialogue 33 for making camera control, an event display dialogue 34, a panorama screen control dialogue 35, a viewer PTZ (pan, tilt, zoom) control dialogue 36, and the like. Details of the functional dialogues will be described hereinafter.

The operation program 420 waits for an event from the viewer 31 and makes control according to the event. If a display of each functional dialogue is obtained by an event from, for example, a right click menu or the like, such a functional dialogue is displayed. An example of a part of the functional dialogues will be described hereinbelow.

For example, when a movement instruction event of PTZR (pan, tilt, zoom, rotation) is received, the control dialogue 33 for making the camera control transmits a camera control instruction to the network I/F 190 through the network I/F 290. The control dialogue 33 drives the platform 155 by the instruction received by the platform control program 310.

If the transferred instruction is a control instruction of the camera imaging such as AF (auto-focus), AE (auto-exposure), AWB (auto-white balance), or the like, the imaging unit 145 is controlled by the instruction received by the imaging program 300. As other instructions which are input by the control dialogue 33, there are a correction of brightness in the display screen, switchover of a day mode and a night mode, an external device output, and the like.

The event display dialogue 34 for performing an event display receives, for example, a notification from the detecting program 320 and displays the event. When a contact control (external device output) instruction or the like is received by the event display dialogue 34, the contact control instruction is transmitted to the network I/F 190 through the network I/F 290 and the I/O device 165 is controlled by the instruction received by the detecting program 320. The following information is included in the event display dialogue 34: the presence or absence of an external device input; the presence or absence of a detection by an intelligent function (video detection); and the presence or absence of a detection by an intelligent function (sound volume detection). In the embodiment, it is possible to input from two external devices. As an intelligent function (video detection), for example, 15 kinds of settings can be made and whether or not the detection has been made by the intelligent function is displayed.

The panorama screen control dialogue 35 for making panorama control displays, for example, a panorama image stored in the device data 370. When a part on the displayed panorama image is designated by the GUI, the camera control instruction is transmitted to the network I/F 190 through the network I/F 290 and the platform 155 is driven by the instruction received by the platform control program 310.

The viewer PTZ control dialogue 36 displays image data of the delivery data 490 at an interval of, for example, 1 second, superimposes and displays a rectangle at cut-out range coordinates designated by the viewer data 470, and enlargedly displays an image in a range designated by this rectangle to the monitor video display unit 32. The viewer PTZ is a GUI for displaying the whole video image of a camera angle of view and cutting out on the viewer side. By enlarging, reducing, or moving the rectangle by a GUI process, the coordinates of the cut-out range are controlled, a display range is controlled, and the cut-out range coordinates of the viewer data 470 are also updated. In a state where the viewer PTZ control dialogue 36 is displayed, the cut-out of the image by the viewer PTZ function and the enlarged display of the cut-out image can be performed. In a state where the viewer PTZ control dialogue 36 is not displayed, the cut-out of the image by the viewer PTZ function and the enlarged display of the cut-out image cannot be performed.

Figure 4:
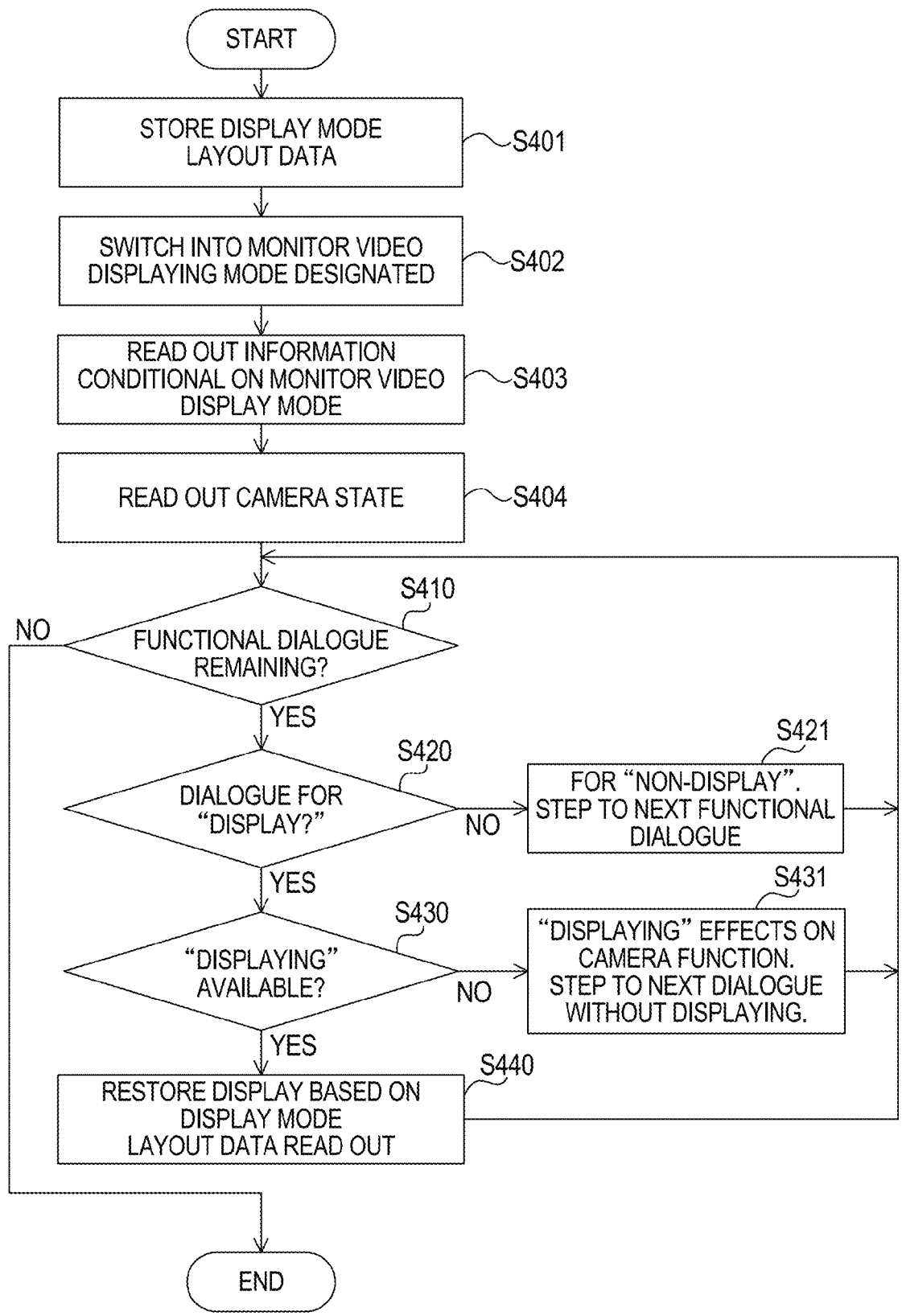
FIG. 4 is a flowchart for describing processes which are executed by a display mode switchover program.

Subsequently, FIG. 4 illustrates a flowchart for a flow of processes of the display mode switchover program 430 in the embodiment. The display mode switchover program 430 is non-transitorily stored into the auxiliary storage 230. The CPU 210 reads out the display mode switchover program 430 from the auxiliary storage 230, stores into the main memory 220, and executes. The CPU 210 is a computer. The auxiliary storage 230 stores the display mode switchover program 430 so that the CPU 210 can read out.

For example, if the current monitor video display mode is a normal display mode and a switchover event to the full-screen display mode was sent from the operation program 420, in S401, position coordinates (x, y) of the functional dialogue and ON/OFF of the display data of "displaying"/"non-display" are stored as display mode layout data 480 into the auxiliary storage 230 so as to be conditional on the normal display mode of the monitor video display mode.

An example of the display mode layout data 480 is illustrated as display information 51 in FIG. 5. As for those data, layout information for display is held every display mode name and every function name by an X-coordinate and a Y-coordinate of relative coordinate values (x, y) in which, for example, a left upper position of the viewer 31 is assumed to be an origin (0, 0) and ON/OFF of the display data of "displaying"/"non-display". If the current monitor video display mode is the normal display mode, the positions of the dialogues 33, 34, 35, and 36 of the respective functions of control of the normal display mode, event displaying, panorama screen control, and viewer PTZ and ON/OFF of "displaying" are stored into the auxiliary storage 230. FIG. 5 illustrates a state where, in the normal display mode, the control, event displaying, and panorama screen control dialogues 33, 34, and 35 are being displayed and the viewer PTZ control dialogue and the sound dialogue are not displayed.

Figure 6:
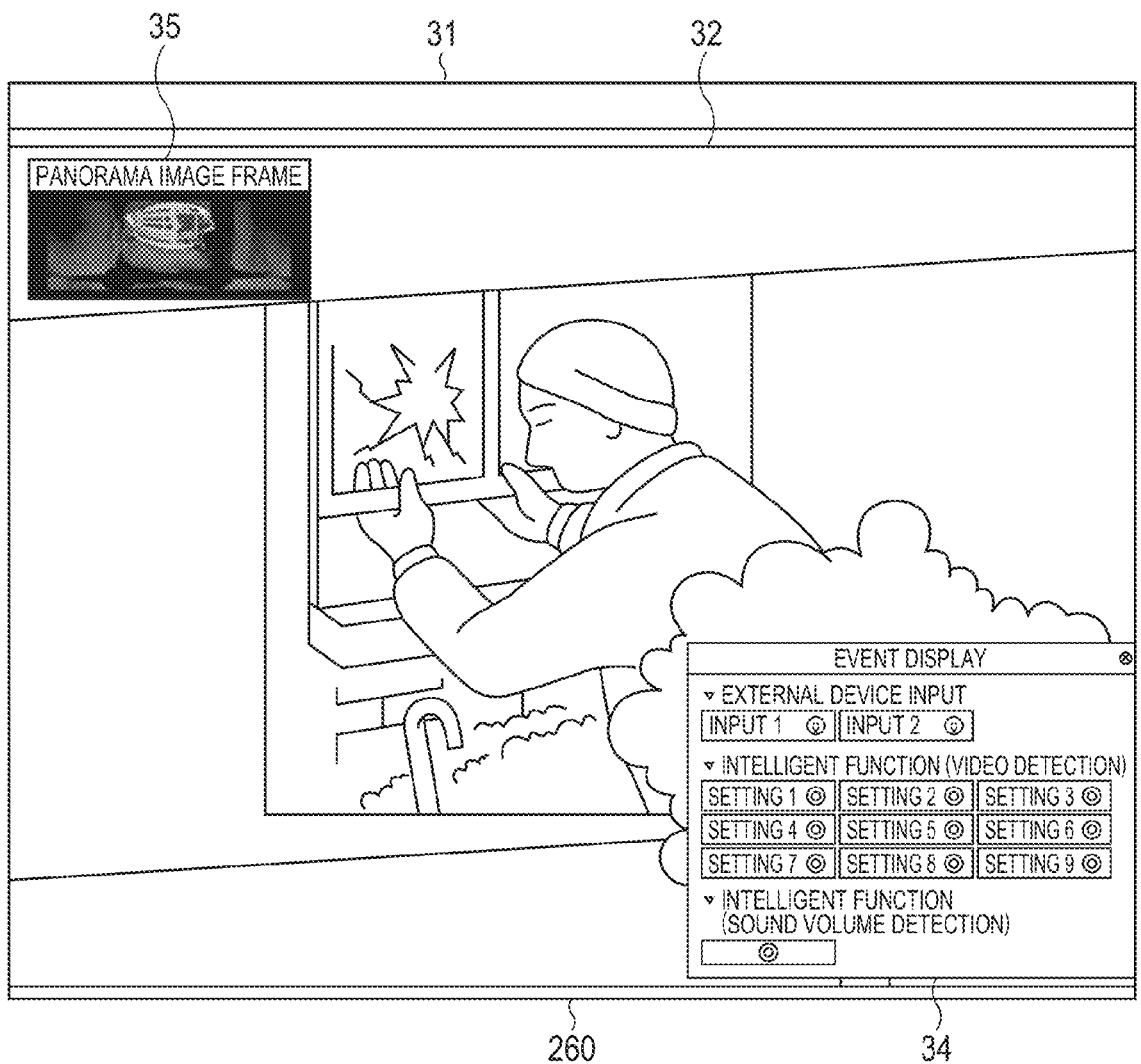
FIG. 6 is a diagram illustrating a display example of a full-screen display mode.

Subsequently, in S402, the display mode is switched to the full-screen display mode of the designated monitor video display mode. For example, in this case, as illustrated in FIG. 6, the display mode is switched so that the monitor video display unit 32 is enlargedly displayed onto the full screen.

After that, in S403, the display mode layout data 480 of the full-screen display mode of the designated monitor video display mode is read out of the auxiliary storage 230. Subsequently, in S404, the device data 370, viewer data 470, and the like are read out as camera information from the auxiliary storage 130 or 230.

Although details will be described in an embodiment hereinafter, the device data 370 includes preset information, mask information, visible range information, current PTZR position, and the like of the camera. For example, the viewer data 470 includes camera operation information of the viewer 31 of the image display apparatus 200 such as "The viewer PTZ functional dialogue is set to function ON by display on.", "The sound functional dialogue is not set to function ON by display on but depends on a state of check box.", and the like.

Subsequently, in S410, whether or not any other non-restored functional dialogues remain is discriminated. If the non-restored functional dialogues do not remain, the processing routine is finished. If the non-restored functional dialogues remain, S420 follows.

In S420, whether or not the display mode of the display mode layout data 480 of the selected functional dialogue is the display mode after the switching (for example, full-screen display mode) and is "ON" (displaying) is discriminated. If it is not "ON", S421 follows and the processing routine is returned to S410 in order to check the next functional dialogue without displaying. If it is "ON", the processing routine advances to a discriminating procedure of S430.

In S430, whether or not the relevant functional dialogue may be displayed is discriminated on the basis of the current camera information.

For example, it is assumed that the display information 51 of the display mode layout data 480 of the viewer PTZ dialogue of the full-screen display mode has been recorded as "ON". However, if the dialogue is displayed in the case where the viewer PTZ function is OFF (dialogue is "non-display") during the normal display mode, the function is turned on as if it was designated by the viewer data 470 in spite of the mode switchover.

As mentioned above, for example, such a dialogue that if it is displayed, it exerts an influence on the function or the like is discriminated in S430. If it must not be displayed, S431 follows. Camera operation information of the viewer 31 showing that the viewer PTZ function is OFF at present (during the normal display mode) has been registered as viewer data 470 in the camera information. The camera operation information of the viewer 31 showing that if the viewer PTZ function was turned off as viewer data 470 before the switchover of the display mode, even when the display information of the viewer PTZ is ON in the display mode (full-screen display mode) after the switchover, the dialogue is not displayed has been registered as viewer data 470. That is, each time ON/OFF of the viewer PTZ function is switched, information showing whether the viewer PTZ function is ON or OFF is registered in the viewer data 470.

Even if the display information 51 is "ON", S430 is skipped, only the position information is restored and the processing routine is returned to S410 in order to check the next functional dialogue without displaying. That is, the display exception discriminating process for excluding such a dialogue that if it is displayed, it exerts an influence on the operation is executed in S430 and S431. As mentioned above, even if the display data of the viewer PTZ in the full-screen display mode is "ON", the viewer PTZ dialogue is not displayed.

On the other hand, if the dialogue may be displayed, S440 follows.

In S440, the display is restored based on the position coordinates (x, y) of the read-out display mode layout data 480. After that, the processing routine is returned to S410 in order to check the next functional dialogue and a processing loop is repeated until the check of all of the functional dialogues to be restored and displayed is finished.

In the case where there is no need to consider the discrimination about the display like a case where there is no camera operation information in the viewer data 470 or the like, the discrimination in S430 is skipped and the processing routine advances to next S440 and the display may be restored in accordance with the held display mode layout data 480.

If the check of all of the functional dialogues to be restored and displayed is finished in S410, the display mode switchover program 430 is finished.

In the case of the full-screen display mode illustrated in FIG. 6, the event display dialogue 34 and the panorama screen control dialogue 35 are set to display (ON) at coordinates different from those in the normal display mode and are displayed. Since the viewer PTZ function is OFF at a point of time when the current normal display mode is finished, the viewer PTZ control dialogue enters a "non-display" state where irrespective of ON/OFF of the display data at a point of time when the previous (before the display mode is switched to the current normal display mode) full-screen display mode is finished.

Although the display mode layout data 480 has been held in the image display apparatus 200 in the embodiment, it may be held in the camera server 100. By doing it, there is such an advantage that a similar layout can be shared by a plurality of clients.

Consequently, a desirable layout can be provided for a plurality of monitor video display modes.

In the first embodiment, whether or not the relevant functional dialogue is displayed is discriminated from the current camera information in step S430 which is executed by the display mode switchover program 430 on the basis of the predetermined viewer data 470. However, the invention is not limited to such an example.

In the second embodiment, an example in which by discriminating by using the device data 370 which was read out in S404 of the display mode switchover program 430 in the first embodiment, the display layout data to be read out is changed, thereby providing the desirable layout will be described.

A constructional diagram of a system in the second embodiment is similar to that of FIG. 1 in the first embodiment.

In the main memory 220 in the system construction, the display mode switchover program 430 is replaced with a second display mode switchover program 431. In the auxiliary storage 230, the display mode layout data 480 is replaced with a second display mode layout data 481.

A flow of processes of the second display mode switchover program 431 in the embodiment will now be described with reference to FIG. 4.

The second display mode switchover program 431 differs from the display mode switchover program 430 in the first embodiment with respect to the operations in steps S430 and S431 in the program 430.

Information which is read in S403 is replaced with the second display mode layout data 481.

The display mode layout data 480 in the first embodiment holds the layout information every "function name" of each "display mode". The second display mode layout data 481 in the second embodiment holds the layout information every "camera preset position" of every "function name" of each "display mode" (not shown).

In a processing step of the embodiment corresponding to S430, after preset information and current PTZR information of the camera showing an imaging state of the camera were obtained by the device data 370 in order to discriminate, whether or not an angle of view of the camera is directed to the preset is compared. On the basis of a comparison result, a discrimination is performed in accordance with the predetermined second display mode layout data 481.

If the display data is "ON", the processing routine advances to a step corresponding to S440 and the display is restored. If the display data is "OFF", in a processing step corresponding to S431, only the position information conditional on the preset and the dialogue is not displayed. The processing routine is returned to a process similar to S410 in order to check the next functional dialogue.

By executing as mentioned above, the desirable layout can be provided every preset to which the camera is directed in a plurality of monitor video display modes.

In the second embodiment, the display position has been restored based on the predetermined position coordinates (x, y) in the processing steps of S440 and S431 of the second display mode switchover program 431. However, the invention is not limited to such a method.

In the embodiment, an example in which by discriminating by using the device data 370 which was read out in S404 of the flowchart of FIG. 4, ON/OFF of the display and the restoring position of the display are changed, thereby providing the desirable layout will be described.

A constructional diagram of the system in the embodiment is similar to that of FIG. 1 in the first embodiment. In the main memory 220 in the system construction, the display mode switchover program 430 is replaced with a third display mode switchover program 432.

A flow of processes of the third display mode switchover program 432 in the embodiment will now be described (not shown) with reference to FIG. 4.

The third display mode switchover program 432 differs from the display mode switchover program 430 in the first embodiment with respect to the operation in the processing step of S430.

In the processing step of the embodiment corresponding to S430, after preset information and mask information showing the display state of the camera and the current PTZR information were obtained by the device data 370 in order to discriminate, information about whether or not the display at the designated position coordinates (x, y) overlaps with the mask display of the monitor video display unit 32 is also used as a discrimination material.

In the case where the display position of the functional dialogue overlaps with the monitor video display unit 32 and also overlaps with the mask display or in the case where it does not overlap with the monitor video display unit 32, the processing routine advances to processing steps similar to S431 and S440 in accordance with ON/OFF of the display data of a third display mode layout data 482 in a manner similar to the process of S430.

In the case where the display position of the functional dialogue overlaps with the monitor video display unit 32 and does not overlap with the mask display, a blank space of the viewer 31 and a mask display portion on the monitor video display unit 32 are searched for. The position coordinates (x, y) of the third display mode layout data 481 are changed to such a position (x, y).

The process for searching for the display position and automatically arranging can be realized by a process in the related art for automatically arranging a plurality of windows into an area.

After the position coordinates (x, y) were changed by the processing step of S430, the processing routine advances to processing steps similar to S431 and S440 in accordance with ON/OFF of the display mode layout data 480.

Although the coordinate position has been changed with respect to the overlap with the mask display as an example in the embodiment, the invention is not limited to such a method. For instance, an area where the overlap is explicitly permitted may be designated in the device data 370.

Instead of performing the process for changing the coordinate position when they overlap, the display data may be changed to "OFF" and the processing routine may advance to the processing step of S431.

By using such a method, the functional dialogues can be displayed in such a manner that when the display mode is switched, the display position does not overlap with a highlighted portion of the monitor video display unit 32 as much as possible, and the more desirable layout can be provided.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-145744, filed on Jun. 28, 2012, which is hereby incorporated by reference herein in its entirety.

What is claimed is:

1. A display control apparatus comprising a processor and a memory including instructions which, when executed by the processor, cause the display control apparatus to:
   determine a state of a function which is executed while a dialogue box relating to the function is displayed; and
   control a displaying of the dialogue box relating to the function, based on data stored in the memory indicating as to whether the dialogue box is displayed or not in accordance with a displaying mode for displaying an image photographed by a camera, and based on the determined state.

2. The display control apparatus according to claim 1, wherein the instructions further cause the display control apparatus to control the displaying of the dialogue box, based on data stored in the memory indicating a position, at which the dialogue box is displayed, according to the displaying mode for displaying the image photographed by the camera, and based on the determined state.

3. The display control apparatus according to claim 1, wherein the instructions further cause the display control apparatus to:
   determine whether the state of the function indicates whether the function is turned on or not, and
   control the displaying of the dialogue box relating to the function, based on data stored in the memory indicating as to whether the dialogue box is displayed or not in accordance with the displaying mode for displaying the image photographed by the camera, and based on the determination as to whether the function is turned on or not.

4. The display control apparatus according to claim 1, wherein the instructions further cause the display control apparatus to determine a state of the function which is executed while the dialogue box for setting the function is displayed.

5. The display control apparatus according to claim 1, wherein the instructions further cause the display control apparatus to control the displaying of the dialogue box, based on data stored in the memory indicating as to whether the dialogue box is displayed or not, according to the displaying mode for displaying the image photographed by the camera, and according to a state of the camera, and based on the determined state.

6. A display control method comprising:
   determining a state of a function which is executed while a dialogue box relating to the function is displayed; and
   controlling a displaying of the dialogue box relating to the function, based on data stored in a memory indicating as to whether the dialogue box is displayed or not in accordance with a displaying mode for displaying an image photographed by a camera, and based on the determined state.

7. The display control method according to claim 6, wherein
   the displaying of the dialogue box is controlled, based on data stored in the memory indicating a position, at which the dialogue box is displayed, according to the displaying mode for displaying the image photographed by the camera, and based on the state determined.

8. The display control method according to claim 6, wherein
   the determining the state includes determining whether the state of the function indicates whether the function is turned on or not, and
   the displaying of the dialogue box relating to the function is controlled, based on data stored in the memory indicating as to whether the dialogue box is displayed or not in accordance with the displaying mode for displaying the image photographed by the camera, and based on the determination as to whether the function is turned on or not.

9. The display control method according to claim 6, wherein
   the displaying of the dialogue box is controlled, based on data stored in the memory indicating as to whether the dialogue box is displayed or not, according to the displaying mode for displaying the image photographed by the camera, and according to a state of the camera, and based on the state determined.

10. A non-transitory storage medium storing a computer program for controlling displaying of an image photographed by a camera, wherein, when executed by a processor, the computer program causes the processor to:
    determine a state of a function which is executed while a dialogue box relating to the function is displayed; and
    control a displaying of the dialogue box relating to the function, based on data stored in a memory indicating as to whether the dialogue box is displayed or not in accordance with a displaying mode for displaying an image photographed by a camera, and based on the state determined.

11. The non-transitory storage medium according to claim 10, wherein
    the displaying of the dialogue box is controlled, based on data stored in the memory indicating a position, at which the dialogue box is displayed, according to the displaying mode for displaying the image photographed by the camera, and based on the state determined.

12. The non-transitory storage medium according to claim 10, wherein
the determining the state includes determining whether the state of the function indicates whether the function is turned on or not, and
the displaying of the dialogue box relating to the function is controlled, based on data stored in the memory indicating as to whether the dialogue box is displayed or not, in accordance with the displaying mode for displaying the image photographed by the camera, and based on the determination as to whether the function is turned on or not.

13. The non-transitory storage medium according to claim 10, wherein
the displaying of the dialogue box is controlled, based on data stored in the memory indicating as to whether the dialogue box is displayed or not, according to the displaying mode for displaying the image photographed by the camera, and according to a state of the camera, and based on the state determined.

14. The non-transitory storage medium according to claim 10, wherein
the displaying of the dialogue box is controlled, based on data stored in the memory indicating a position, at which the dialogue box is displayed, according to the displaying mode for displaying the image photographed by the camera, based on the state determined, and based on a processing for the image photographed by the camera.

15. The display control apparatus according to claim 1, wherein the displaying mode includes a full-screen mode, and
wherein the instructions further cause the display control apparatus to control the displaying of the dialogue box relating to the function, based on the data stored in the memory indicating whether the dialogue box is displayed or not in accordance with whether the displaying mode for displaying an image photographed by the camera is the full-screen mode or not, and based on the determined state.

16. The display control apparatus according to claim 1, wherein the instructions further cause the display control apparatus to control the displaying of the dialogue box related to the function for cutting out a part from the image photographed by the camera for displaying the part of the image in accordance with the displaying mode.

17. The display control method according to claim 6, wherein
the state of the function which is executed while the dialogue box for setting the function is displayed is determined, and
the displaying of the dialogue box relating to the function is controlled, based on the data stored in the memory indicating whether the dialogue box is displayed or not in accordance with the displaying mode for displaying the image photographed by the camera, and based on the determined state.

18. The display control method according to claim 6, wherein
the displaying mode includes a full-screen mode, and
the displaying of the dialogue box relating to the function is controlled, based on the data stored in the memory indicating whether the dialogue box is displayed or not in accordance with whether the displaying mode for displaying the image photographed by the camera is the full-screen mode or not, and based on the determined state.

19. The display control method according to claim 6, wherein the displaying of the dialogue box related to the function for cutting out a part from the image photographed by the camera for displaying the part of the image in accordance with the displaying mode is controlled based on the data stored in the memory and based on the determined state.

20. The non-transitory storage medium according to claim 10, wherein
the state of the function which is executed while the dialogue box for setting the function is displayed is determined, and
the displaying of the dialogue box relating to the function is controlled, based on the data stored in the memory indicating whether the dialogue box is displayed or not in accordance with the displaying mode for displaying the image photographed by the camera, and based on the determined state.

21. The non-transitory storage medium according to claim 10, wherein
the displaying mode includes a full-screen mode, and
the displaying of the dialogue box relating to the function is controlled, based on the data stored in the memory indicating whether the dialogue box is displayed or not in accordance with whether the displaying mode for displaying the image photographed by the camera is the full-screen mode or not, and based on the determined state.

22. The non-transitory storage medium according to claim 10, wherein the displaying of the dialogue box related to the function for cutting out a part from the image photographed by the camera for displaying the part of the image in accordance with the displaying mode is controlled based on the data stored in the memory and based on the determined state.

* * * * *